Nov. 13, 1923.
W. T. SIMPSON
1,474,297
LOADING APPARATUS FOR GASOLINE TANK CARS
Filed Dec. 6, 1921
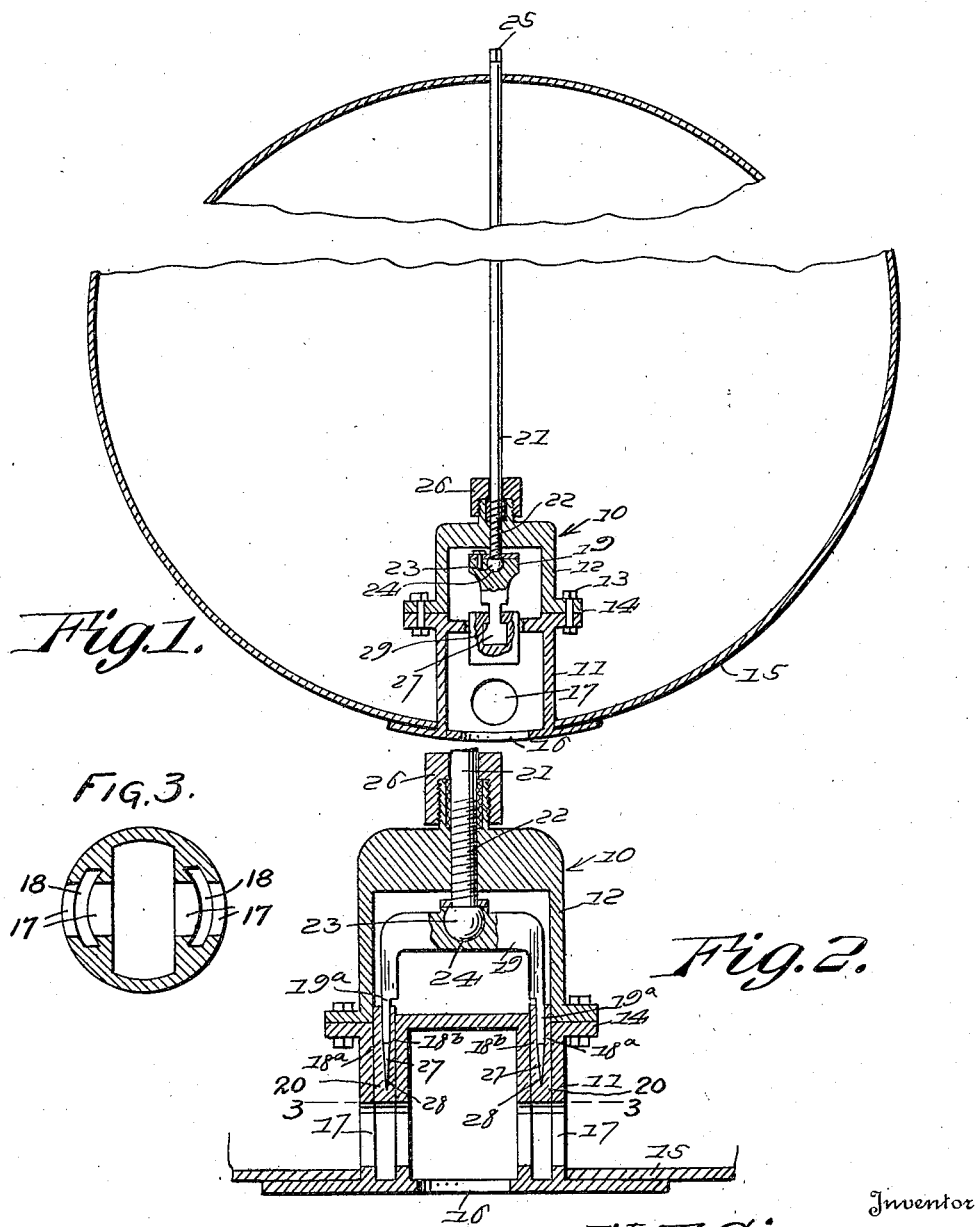
Inventor
W.T.Simpson,
By [signature]
Attorney Patented Nov. 13, 1923.

1,474,297

UNITED STATES PATENT OFFICE.

WILLIAM T. SIMPSON, OF WAGONER, OKLAHOMA.

LOADING APPARATUS FOR GASOLINE TANK CARS.

Application filed December 6, 1921. Serial No. 520,369.

*To all whom it may concern:*

Be it known that WILLIAM T. SIMPSON, a citizen of the United States of America, residing at Wagoner, in the county of Wagoner and State of Oklahoma, has invented new and useful Improvements in Loading Apparatus for Gasoline Tank Cars, of which the following is a specification.

The object of the invention is to provide a loading valve for tank cars particularly designed for gasoline and like volatile oils whereby the loading and unloading may be effected without waste of the material and whereby leakage from the car by way of the loading valve may be prevented to guard against accidents in the way of explosions occurring in the railroad yards or where the cars may be permitted to stand for any length of time on sidings; and with this object in view the invention consists in a construction and combination of parts of which a preferred embodiment is shown in the accompanying drawings, wherein:

Figure 1 is a cross sectional view of a tank car provided with a loading valve constructed in accordance with the invention.

Figure 2 is a sectional view of the valve taken at right angles to the plane of Figure 1.

Figure 3 is a section on the line 3—3 of Figure 2.

The valve casing 10 which is preferably of sectional construction and comprises the base member 11 and cap member 12 connected by bolts 13 in suitable flanges 14, is arranged within the car body or tank 15 over the outlet opening 16 with which hose or piping may be connected in accordance with methods ordinarily employed in this connection, the base section of the casing being provided with lateral openings 17 and formed with guides 18. The openings 17 are arranged to extend through both shells and are in registering relation.

The valve proper consists of a yoke 19 carrying wings 20 which operate in said guides, and to the yoke is connected a stem 21 threaded in a guide opening 22 in the cap member of the casing and having a swivel connection with the yoke by means of a ball 23 fitted in a socket 24. The stem is adapted to extend to the top of the car or tank but provided with means for the engagement of a wheel or wrench or other like operating device, for which purpose it is shaped to form an angular wrench seat 25. The stem also passes through a suitable stuffing box 26.

The valve wings are of split, transversely expansible construction having the relatively movable leaves 18$^a$—18$^b$ and the depending arms 19$^a$ of the yoke are provided with wedges 27 fitting in registering recesses 28 formed in the facing surfaces of the valve wing leaves. There is provision by reason of the recesses being slightly longer than the wedges for a limited lost motion between the yoke and the valve wing so that when the valve stem is rotated to impart closing movement to the valve yoke the wings are lowered until the lower edges thereof come in contact with the lower ends of the guides in which position said wings are in closing relation with the openings 17, whereupon a slight further depression of the yoke due to a further turning of the stem will depress the wedges with relation to the wings and thereby spread the leaves to effect a gas tight seating of the valve wings to guard against possible leakage. Obviously when the valve is to be opened to permit of the discharge or introduction of material the first movement of the yoke serves to move the wedges independently of the leaves of the valve wings to relieve the lateral pressure thereon whereupon the shoulders 29 at the upper ends of the wedges engage the upper walls of the recesses and raise the valve wings to effect the desired exposure of the openings.

Having described the invention, what is claimed as new and useful is:—

1. A loading device for gasoline tank cars consisting of a valve casing in communication with an opening in the wall of the car and provided with lateral openings, said casing having its walls slotted to provide valve guides, and a valve having wings slidably fitted in said guides and operating means for communicating sliding movement thereto, the valve wings being of transversely expansible construction and having expanding means actuable by the wing operating devices.

2. A loading device for gasoline tank cars consisting of a valve casing in communication with an opening in the wall of the car and provided with lateral openings, said casing having its walls slotted to provide valve guides, and a valve having wings slidably fitted in said guides and operating means for communicating sliding movement thereto, the valve wings consisting of transversely movable leaves and spreaders arranged between the leaves and actuable by the valve operating means.

3. A loading device for gasoline tank cars consisting of a valve casing in communication with an opening in the wall of the car and provided with lateral openings, said casing having its walls slotted to provide valve guides, and a valve having wings slidably fitted in said guides and operating means for communicating sliding movement thereto, the valve wings consisting of transversely movable leaves having facing recesses and wedges arranged in said recesses and actuable by the valve operating means.

4. In a device for the purpose indicated, a valve casing having its walls slotted to provide guides and being formed with registering ports on opposite sides of said slots, valve wings slidably fitted in the slots for arrangement in closing relation with the ports, a yoke having arms connected respectively with said wings for moving the same to effect opening and closing of the ports, and an operating stem having a swivel connection with the yoke and a threaded connection with the end of the valve casing.

5. In a device for the purpose indicated, a valve casing having its walls formed with slots to provide guides and formed with registering ports on opposite sides of the slots, valve wings slidably fitted in the slots for arrangement in closing relation with the ports, a yoke having arms connected respectively with said wings for moving the same to effect opening and closing of the ports, an operating stem having a swivel connection with the yoke and a threaded connection with the end of the valve casing, each valve wing being split to form transversely movable leaves, and means carried by the yoke arms for transversely moving the leaves to expand the wings when they reach the port closing position.

In testimony whereof he affixes his signature.

WILLIAM T. SIMPSON.